United States Patent
Bedeloğlu et al.

(10) Patent No.: US 12,451,298 B2
(45) Date of Patent: Oct. 21, 2025

(54) PRODUCTION OF POROUS CARBON NANOFIBER ELECTRODE USING PAN-PVA HYBRID NANOFIBER AS PRECURSOR MATERIAL FOR SOLID-STATE SUPERCAPACITORS

(71) Applicant: BURSA TEKNIK ÜNIVERSITESI, Bursa (AR)

(72) Inventors: Ayşe Bedeloğlu, Bursa (AR); Yasin Altin, Bursa (AR)

( * ) Notice: Subject to any disclaimer, the term of this patent is extended or adjusted under 35 U.S.C. 154(b) by 115 days.

(21) Appl. No.: 18/294,238

(22) PCT Filed: Jul. 25, 2022

(86) PCT No.: PCT/TR2022/050782
§ 371 (c)(1),
(2) Date: Feb. 1, 2024

(87) PCT Pub. No.: WO2023/014328
PCT Pub. Date: Feb. 9, 2023

(65) Prior Publication Data
US 2024/0347282 A1    Oct. 17, 2024

(30) Foreign Application Priority Data
Aug. 3, 2021  (TR) .............................. 2021/012257

(51) Int. Cl.
*H01G 11/36* (2013.01)
*H01G 11/24* (2013.01)
(Continued)

(52) U.S. Cl.
CPC ............. *H01G 11/36* (2013.01); *H01G 11/24* (2013.01); *H01G 11/28* (2013.01); *H01G 11/34* (2013.01); *H01G 11/56* (2013.01); *H01G 11/86* (2013.01)

(58) Field of Classification Search
CPC ........ H01G 11/36; H01G 11/24; H01G 11/28; H01G 11/34; H01G 11/56; H01G 11/86; H01G 11/84; Y02E 60/13
See application file for complete search history.

(56) References Cited

U.S. PATENT DOCUMENTS

2012/0236467 A1   9/2012 Kang et al.
2019/0067690 A1 * 2/2019 Chen ....................... B22F 1/056
(Continued)

FOREIGN PATENT DOCUMENTS

CN    111599607 A     5/2022
CN    113233466 B  *  8/2022    ............. B82Y 40/00
(Continued)

OTHER PUBLICATIONS

Translation CN '466 (Year: 2022).*
(Continued)

*Primary Examiner* — Dion R. Ferguson
(74) *Attorney, Agent, or Firm* — Egbert, McDaniel & Swartz, PLLC

(57) ABSTRACT

Disclosed is a PAN-PVA hybrid nanofiber-based porous carbon nanofiber electrode, which has a large surface area, low production cost, easy scalability, tunable structure, effective ion diffusion paths, high electrical conductivity, flexibility, free-standing structure, and improved specific capacitance values due to surface area. Also disclosed is the production method for use of the electrode in solid-state supercapacitors.

3 Claims, 4 Drawing Sheets

(51) Int. Cl.
*H01G 11/28* (2013.01)
*H01G 11/34* (2013.01)
*H01G 11/56* (2013.01)
*H01G 11/86* (2013.01)

(56) References Cited

U.S. PATENT DOCUMENTS

2023/0335346 A1* 10/2023 Alamro .................. H01G 11/32
2024/0347282 A1* 10/2024 Bedeloglu .............. H01G 11/84

FOREIGN PATENT DOCUMENTS

| CN | 116623320 A | * | 8/2023 | ............... D01F 9/22 |
|---|---|---|---|---|
| KR | 101147923 B1 | | 7/2012 | |
| KR | 101374953 B | | 3/2014 | |
| KR | 101984852 B1 | * | 5/2019 | ............. H01M 4/04 |
| WO | 2015023193 A1 | | 2/2015 | |
| WO | 2017091474 A1 | | 6/2017 | |
| WO | 2017136114 A1 | | 8/2017 | |
| WO | 2018208382 A1 | | 11/2018 | |
| WO | 2019164561 A1 | | 8/2019 | |
| WO | WO-2020081167 A2 | * | 4/2020 | ............. H01M 4/96 |

OTHER PUBLICATIONS

Translation '320 (Year: 2023).*
Translation KR '852 (Year: 2019).*
Translation WO '167 (Year: 2020).*
International Search Report for corresponding PCT/TR2022/050782 dated Apr. 14, 2023.
Written Opinion of the International Searching Authority for corresponding PCT/TR2022/050782 dated Apr. 14, 2023.

* cited by examiner

PRODUCTION OF POROUS CARBON NANOFIBER ELECTRODE USING PAN-PVA HYBRID NANOFIBER AS PRECURSOR MATERIAL FOR SOLID-STATE SUPERCAPACITORS

TECHNICAL FIELD

The invention relates to the production of carbon nanofiber electrodes suitable for use in flexible supercapacitors, containing PAN/PVA hybrid nanofiber production as precursor material, and also having pores between and on the nanofibers.

PRIOR ART

Supercapacitors stand out with their superior features such as high power and energy density, fast charging/discharging, wide operating temperature range and long cycle life.

In supercapacitors, carbon-based materials such as activated carbon, graphene, carbon nanotube, carbon nanofiber, metal oxides/sulfides/nitride or conductive polymers are used as electrodes. In recent years, there are hybrid electrodes in which these two material types are used together.

Among these materials, carbon nanofibers have been used as electrode material in many studies, thanks to their advantages such as large surface area, low production cost, easy scalability, adjustable structure, effective ion diffusion paths, high electrical conductivity, flexibility and free-standing-structure.

Electrospinning technique is an effective, common, versatile and less time consuming method in the production of polymer nanofibers. Although polymers such as lignin, cellulose, polybenzimidazole and polyimide (PI) can be used as precursor materials, polyacrylonitrile (PAN) is the most common polymer precursor material in carbon nanofiber production due to its easy electroproducibility and high carbon yield.

Since charge is stored at the electrode-electrolyte interface in electrical double-layer capacitors, large surface area is one of the most important parameters affecting supercapacitor performance. Therefore, the surface area of carbon nanofibers can be increased by various processes such as surface activation or internal pore production methods.

The above explanations necessitate a study on improving the production of supercapacitors and increasing their properties.

The following documents were encountered during the preliminary patent search.

In the document with application number CN111599607A, an electrode with an expanded surface area is mentioned. This hollow-designed electrode improves charge storage properties but does not include a macro-level area increase.

In the document application with number WO2019164561A1, an electrode produced with a hybrid material is mentioned. By placing metal oxide between the graphene sheets, a nano-level charge storage area was created between the sheets, and a structure that could be used in supercapacitors was obtained due to its shapeability. However, the fact that the plates do not stand in a certain way and the metal oxides are distributed unevenly cause decreases in efficiency.

In the document with application number WO2018208382A1, it is mentioned about the electrode consisting of concentric and rounded plates that do not touch each other. Thanks to this structure, the porous separator material placed between the electrode materials (anode and cathode) with an increased surface area provides an increase in the capacitance values, but the structure of the separator material is open to improvement and it has made it necessary to carry out other studies in order to use it more efficiently. In this study, which also mentions the obstacles in using this porous structure more efficiently, there is no innovation in the production of the separator material.

In the document with application number WO2017136114A1, a graphene-containing supercapacitor with laminar structure is mentioned. The layered structure formed in the system, which includes graphene sheets positioned parallel to each other, is placed between the electrodes, increasing the amount of charge storage. The load storage system of the building is provided by the gaps between the graphene sheets, and materials with technical features added to the gaps are not mentioned.

In the document with application number WO2017091474A1, an electrode production process with layers is mentioned. The porous material placed between the electrodes and the technical properties that this material provides to the capacitor are explained. In the production of the mentioned material, materials that provide ease of production such as PVA and/or PAN are not mentioned.

In the document with the application number KR101147923B1, the production of the porous structure that is used conventionally is mentioned. With the use of metal oxides, the charge storage properties, savings and production speed of the porous carbon nanofiber structure are mentioned, but the PVA-PAN content and its advantage over the properties provided by the PVA-PAN hybrid polymer are not mentioned. PVA-PAN hybrid polymer also provides additional properties not mentioned in the study. The work requested to be protected is the developed version of the document with the application number KR101147923B1 as can be understood from the detailed explanation below.

As a result, all the problems mentioned above have made it necessary to make an innovation in the related field.

Objective of the Invention

The present invention aims to eliminate the above-mentioned problems and to make a technical innovation in the related field.

The main purpose of the invention is to reveal the structure of increasing the capacitance value of carbon nanofiber supercapacitors, thanks to the pores formed by using PAN/PVA hybrid nanofiber structure as the precursor material for the carbon nanofiber electrode materials used in supercapacitors.

Another aim of the invention is to reveal the method of producing scalable, adjustable, highly conductive, and flexible electrodes without the need for a binding conductive filler thanks to its free-standing structure, and to reveal the structure of the electrode produced by this method.

BRIEF DESCRIPTION OF THE INVENTION

In order to achieve all the above-mentioned objectives and which will emerge from the detailed description below, the present invention is based on the production of porous carbon nanofiber electrode which PAN/PVA hybrid nanofiber used as precursor polymer, used in solid-state supercapacitor. PVA-PAN mixture with a total polymer concentration of 7.5 wt % (67% PAN-33% PVA by weight) was dissolved in a DMF:DMSO solvent mixture (2:1 weight ratio) at 80° C. for 12 hours by magnetic stirring. The prepared polymer solution was electrospun at the conditions which end-collector distance was determined in the range of 12.5-22.5 cm, the polymer feed rate was selected as 0.5-3 ml/hour, the rotation speed of the positively charged aluminum drum was adjusted as 100-500 rpm, and the applied voltage to the drum selected as 20-35 kV. The produced PAN/PVA hybrid nanofiber mat was heated from room temperature to 250-300° C. with a heating rate of 1-4° C./min and then kept at 250-300° C. for 60-120 min in the air atmosphere for stabilization. For the carbonization process, stabilized nanofiber was heated from room temperature to 250-300° C. with a heating rate of 5-20° C./min and kept at 250-300° C. for 30-90 min, then it was heated from 250-300° C. to 800-1500° C. with a heating rate of 2-10° C./min and kept at 800-1500° C. for 2-5 hours in an argon atmosphere.

The invention also includes the electrode structure produced according to an electrode production method suitable for any embodiment that may appear in the claims or in the detailed embodiment. The produced electrode has a porous structure and, thanks to its porous structure, it is flexible, easily scalable, and has increased surface area, and thanks to the increased surface area, it has increased specific capacitance values compared to neat carbon nanofiber electrodes.

In order to realize all the objectives mentioned above and which will emerge from the detailed description below, the present invention is according to claim 2, which has a polymer electrolyte between the flexible underlay, flexible underlays, and aluminum foil and aluminum foil layers positioned adjacently on the bottom and top layer, or in the detailed embodiment. It is a solid-state supercapacitor containing two porous carbon nanofiber electrodes suitable for any configuration.

In order to achieve all the objectives mentioned above and which will emerge from the detailed description below, the present invention is a solid-state supercapacitor consisting of a flexible substrate, aluminum foil, the polymer-gel electrolyte sandwiched between two porous carbon nanofiber electrodes, which are produced according to claim 2 or any configuration that may arise in detailed construction, aluminum foil, and flexible substrate layers, respectively.

BRIEF DESCRIPTION OF THE FIGURES

Drawings do not necessarily need to be scaled and details not necessary for understanding the present invention may be omitted. Furthermore, elements that are at least substantially identical or have at least substantially identical functions are denoted by the same number.

EXPLANATION OF REFERENCE NUMBERS IN THE FIGURES

Figure 1:
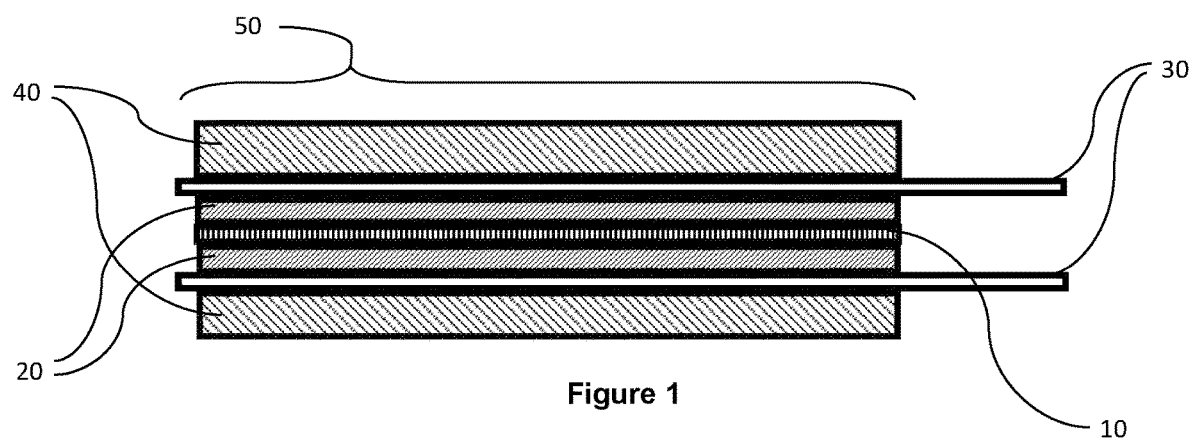
FIG. 1 shows a schematic representation of a solid-state supercapacitor containing a porous carbon nanofiber electrode.

10. Polymer electrolyte
20. Porous carbon nanofiber electrode using PAN-PVA hybrid nanofiber as precursor material
30. Aluminum foil
40. Flexible substrate
50. Solid-state supercapacitor

DETAILED DESCRIPTION OF THE INVENTION

In this detailed explanation, the subject of the invention, "production of porous carbon nanofiber electrodes using PAN-PVA hybrid nanofiber as a precursor material for use in solid-state supercapacitors" is explained only with examples that will not have any limiting effect so that the subject can be better understood.

The subject of the invention relates to the production of porous carbon nanofiber electrodes which has a porous structure with etching, stabilization and carbonization processes and is suitable for use in flexible supercapacitors thanks to the use of PAN-PVA hybrid nanofiber as the precursor material, and its use in solid-state supercapacitors (50).

The invention relates to a PAN-PVA hybrid nanofiber-based porous carbon nanofiber electrode, which provides a large surface area, low production cost, easy scalability, adjustable structure, effective ion diffusion paths, high electrical conductivity, flexibility, free-standing structure, and improved specific capacitance depending on the surface area, a production method for use in solid-state supercapacitors.

The solid-state supercapacitor schematically illustrated in FIG. 1; Aluminum foil (30) and aluminum foil (30) layers that provide protection from external influences on the bottom and top layers and do not interfere with the flexibility of the material, flexible pads (40) for storage purposes and which will allow the next charge to go towards the electrolyte. It is characterized by containing two porous carbon nanofiber electrodes (20) between which there is a polymer electrolyte (10).

The solid-state supercapacitor (50) includes the components listed below. These components are a flexible substrate (40) that provides protection from external influences on the bottom and top layers and do not interfere with the flexibility of the material, aluminum foil (30) which is positioned adjacent to the flexible substrate (40) to collect the current, and two porous carbon nanofiber electrodes (20) with polymer electrolyte (10) in the interlayer between the aluminum foils (30).

Figure 2:
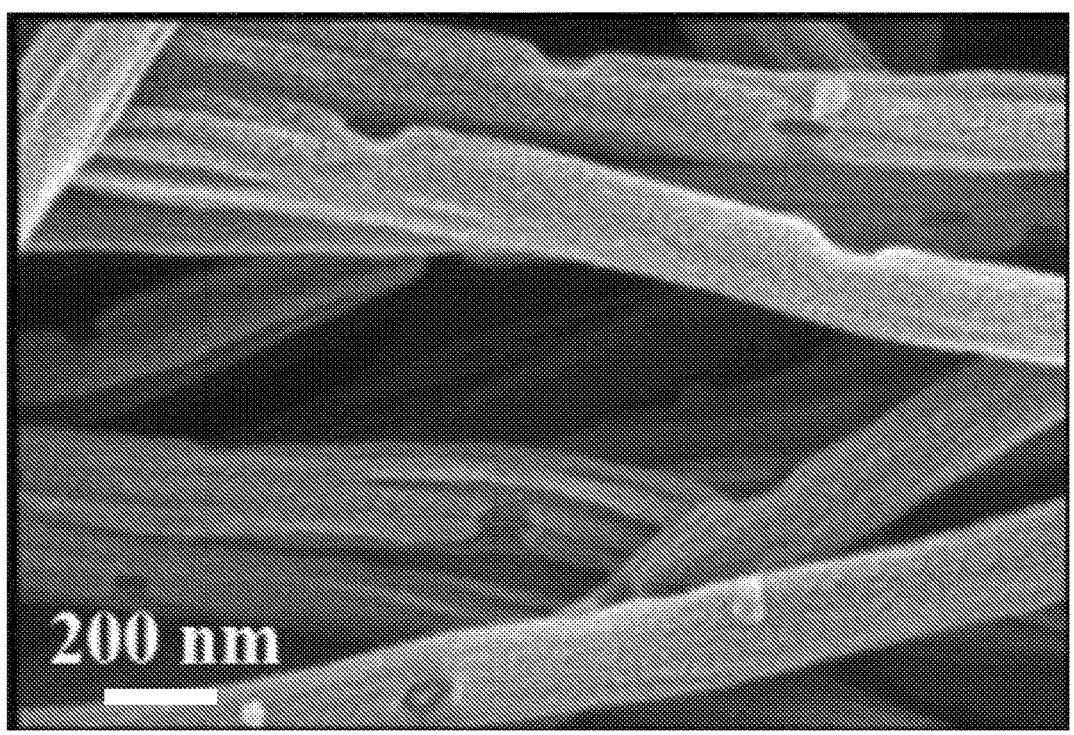
In FIG. 2, the SEM image of the EK5 sample, which is a porous carbon nanofiber electrode with the most suitable PVA ratio and the PVA in its structure was removed by etching, is shown.

Thanks to the porous carbon nanofiber electrode (20) system as seen in FIG. 2, the aforementioned solid-state supercapacitor (50), ion transfer between the electrolyte and the porous carbon nanofiber electrodes (20) increases, and thus, the charge storage performance of the solid-state supercapacitor (50) electrode, which stores the charge at the electrode/electrolyte interface increases. Within the scope of the invention, the electrode material has been developed and can be used by cutting into the desired supercapacitor form.

The solid-state supercapacitor (50) has a large surface area, low production cost, easy scalability, adjustable structure, effective ion diffusion paths, high electrical conductivity, flexibility, free-standing structure, and improved specific capacitance depending on the increase in the surface area caused by the porous carbon nanofiber electrode (20) structure.

The most important aspect of the invention, which provides technical benefits and is unique in its formation, is that it contains a porous carbon nanofiber electrode (20), and this carbon nanofiber production method has optimization steps for the most suitable PAN/PVA hybrid nanofiber ratio used as the precursor material.

Production method of porous carbon nanofiber electrode system;
 Preparation of PAN/PVA polymer solutions,
 Production of PAN/PVA hybrid nanofiber structures,
 Etching of PVA in hybrid nanofiber structure
 Stabilization of nanofibers and
 Carbonization of nanofibers
consists of five steps. The method has been subjected to different optimization studies and the ratios proven to be the most suitable by experiments have been determined.

In order to obtain PAN/PVA hybrid nanofibers, a solution environment in which both polymers can dissolve together is required in the preparation step of polymer solutions. For this purpose, different ratios of PAN/PVA mixtures with a total polymer concentration of 7.5 weight % were dissolved in a 2:1 weight ratio of N, N-dimethylformamide (DMF, ≥99% by weight)/dimethyl sulfoxide (DMSO, 99.9% by weight). The dissolution process of the polymers was carried out by stirring in a magnetic stirrer for at least 12 hours at 80° C. The different PAN-PVA ratios are as in table 1 for six different solutions (S1, S2, S3, S4, S5, S6).

TABLE 1

PAN-PVA ratios used as starting material for six different solutions.

| Solution Used | % PAN | % PVA |
|---|---|---|
| S1 | %100 | — |
| S2 | 95% | 5% |
| S3 | 90% | 10% |
| S4 | 80% | 20% |
| S5 | 67% | 33% |
| S6 | 50% | 50% |

In the step of producing PAN/PVA hybrid nanofiber mats, PAN-PVA hybrid nanofibers were obtained by using the Nanospinner24® electrospinnning device at room temperature with the solutions specified in Table 1. To produce nanofibrous structure, the tip-collector distance was set as 12.5-22.5 cm, the polymer feed rate was chosen as 0.5-3 ml/h, a voltage of 20-35 kV was applied to the positively charged rotating aluminum drum and The rotation speed of the aluminum drum is adjusted as 100-500 rpm. Due to the working principle of the electrospinning method, the solvent evaporates during production, and polymer nanofiber structures are obtained. In the PVA etching step, PAN/PVA hybrid nanofiber mats were kept in hot water at 90° C. for 1-3 hours, so the PVA in the hybrid nanofibers was mostly dissolved in hot water and removed from the structure and then dried at room temperature. This process is called the PVA etching process and it was not applied to 100% PAN nanofiber mats.

In the stabilization step of nanofibers, all nanofiber mats were heated from room temperature to 250-300° C. in an air atmosphere with a heating rate of 1-4° C./min and then kept at 250-300° C. for 60-120 minutes in order to oxidize samples. At the end of the stabilization process, it was observed that the white-colored samples turned brown.

In the carbonization step of nanofibers, the samples stabilized by oxidation were carbonized by gradually heating in an argon atmosphere in ProthermTM®, PZF 12/105/900 tube furnace. The samples were heated from room temperature to 250-300° C. with a heating rate of 5-20° C./min and kept at 250-300° C. for 30-90 minutes. Then, it was heated from 250-300° C. to 800-1500° C. with a heating rate of 2-10° C./min and carbonized at 800-1500° C. for 2-5 hours. During the process, argon gas was fed to the tube furnace at a rate of 20 lt/h.

After these processes, 6 different samples were produced. The first of these is neat carbon nanofibers, which are frequently produced in the literature, and the others are porous carbon nanofibers with different roughness and porosity. Detailed tests could not be performed because the sample produced with S6 solution (50% PAN-50% PVA) did not have sufficient mechanical strength.

Figure 3:
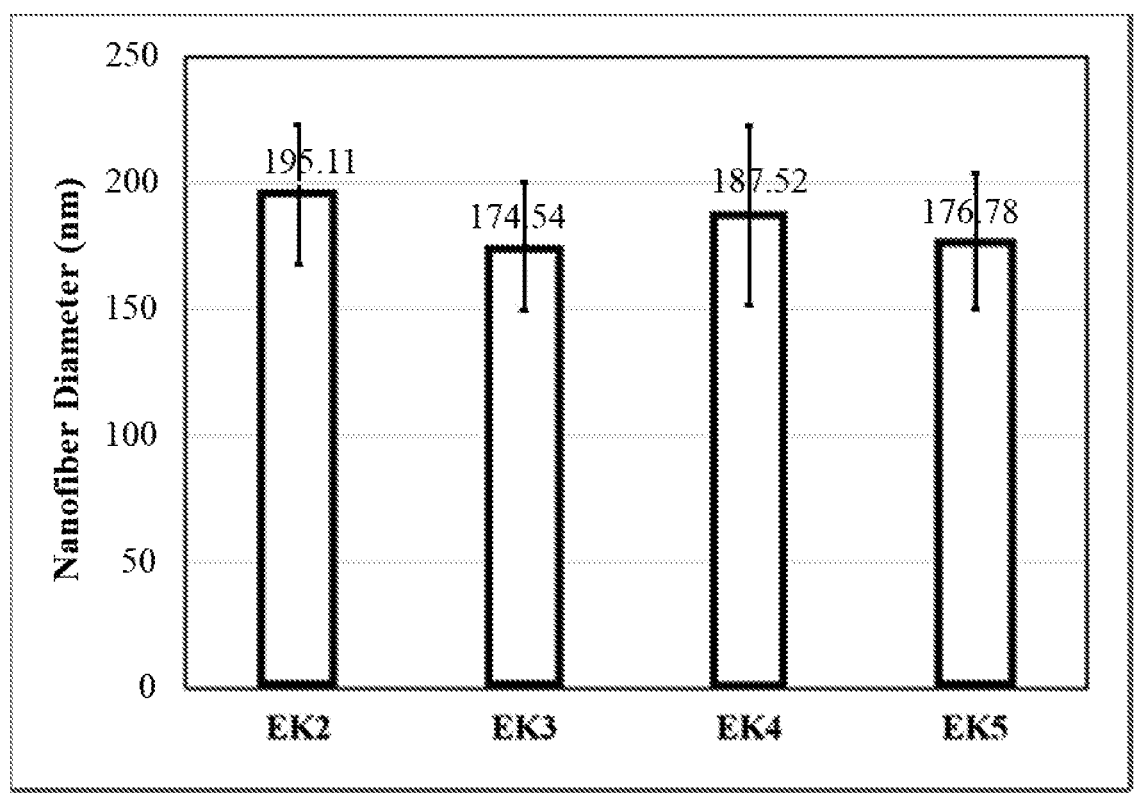
In FIG. 3, the graph of the mean diameter (nm) values of the PVA etched porous carbon nanofiber electrode is shown.

The nanosurfaces prepared with S1, S2, S3, S4, S5 solutions containing different PAN-PVA ratios as precursor materials were named as K1, EK2, EK3, EK4, EK5, respectively. In FIG. 3, the diagram of the mean diameter values of the PVA etched electrodes is shown.

The nanofiber structures are flexible, easily scalable and shape-adjustable.

Figure 4:
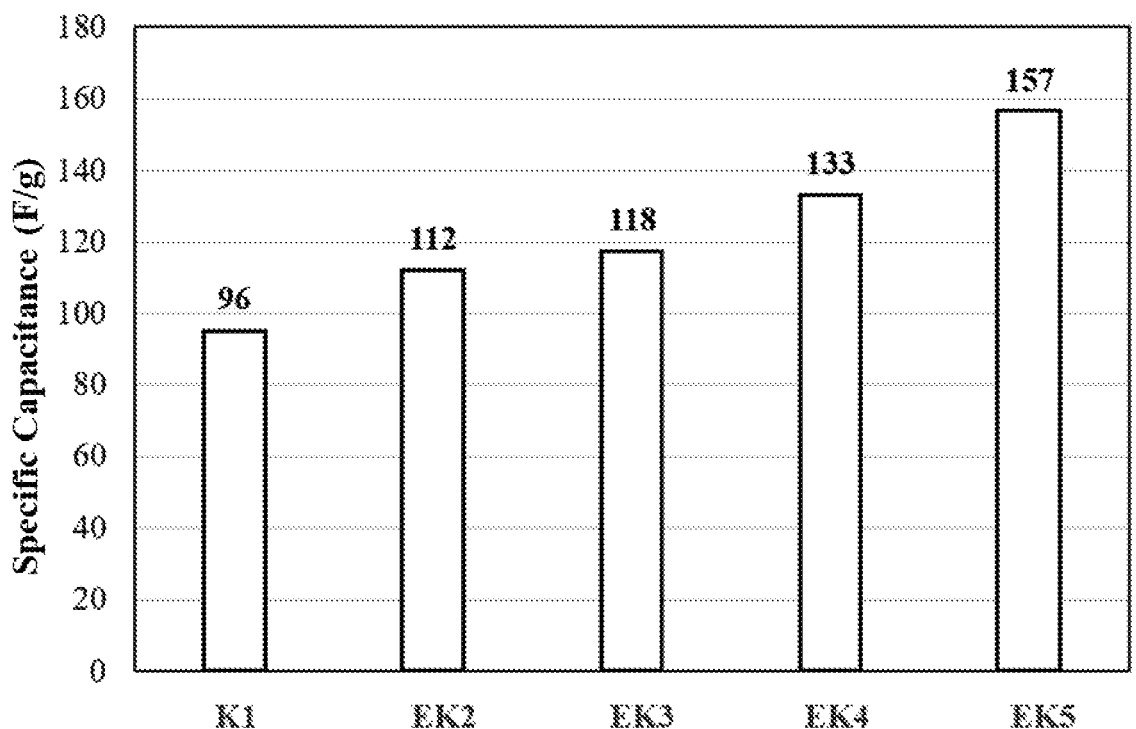
In FIG. 4, the graph of the specific capacitance (F/g) values of carbon nanofibers with different porosity at a scan rate of 5 mV/s is shown.

The electrochemical properties of nanofibers were investigated and in FIG. 4, the diagram of specific capacitance of carbon nanofibers with different porosity at a scan rate of 5 mV/s is shown. It was observed that the sample with the highest specific capacitance was the porous carbon nanofiber sample named EK5 (hybrid nanofiber with starting material 67% PAN-33% PVA). Afterwards, the best performing EK5 sample was analyzed in more detail in terms of electrochemical analysis.

Figure 5:
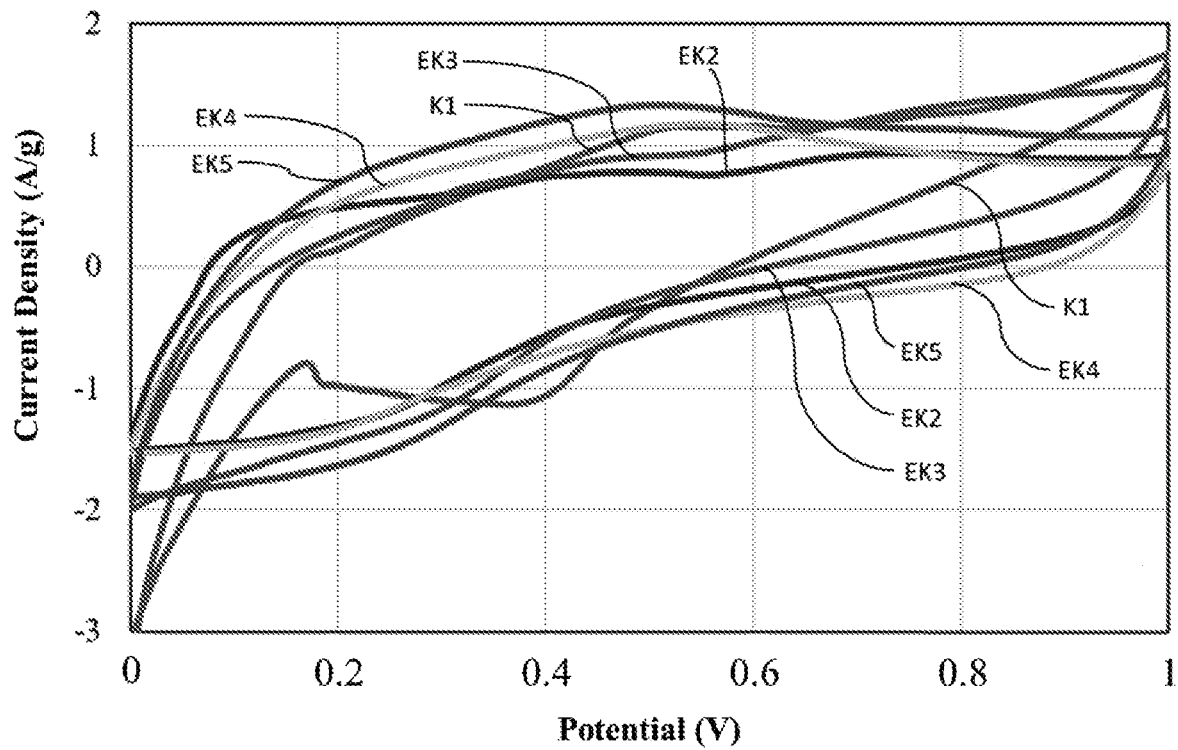
In FIG. 5, cyclic voltammetry (CV) curves of carbon nanofibers with different porosities at a scan rate of 5 mV/s are shown.

In FIG. 5, cyclic voltammetry (CV) curves of carbon nanofibers with different porosity at a scan rate of 5 mV/s are shown. Compared to the carbon nanofiber electrode, which is called K1, produced in the previous technique, and the precursor material is 100% PAN, it is seen that the porous carbon nanofiber, which is the nanofiber surface named EK5 and has a precursor material of 67% PAN-33% PVA, can reach a higher specific capacitance value. In cyclic voltammetry curves, the area between the curve is directly proportional to the specific capacitance. As can be seen from the graph in FIG. 5, the area between the curve increases as the PVA ratio in the precursor material increases.

In FIG. 2, the SEM image of the carbon nanofiber electrode containing EK5, which has the most suitable PVA ratio, is shown. The carbon nanofiber structure with pores can be seen in the SEM image.

Figure 6:
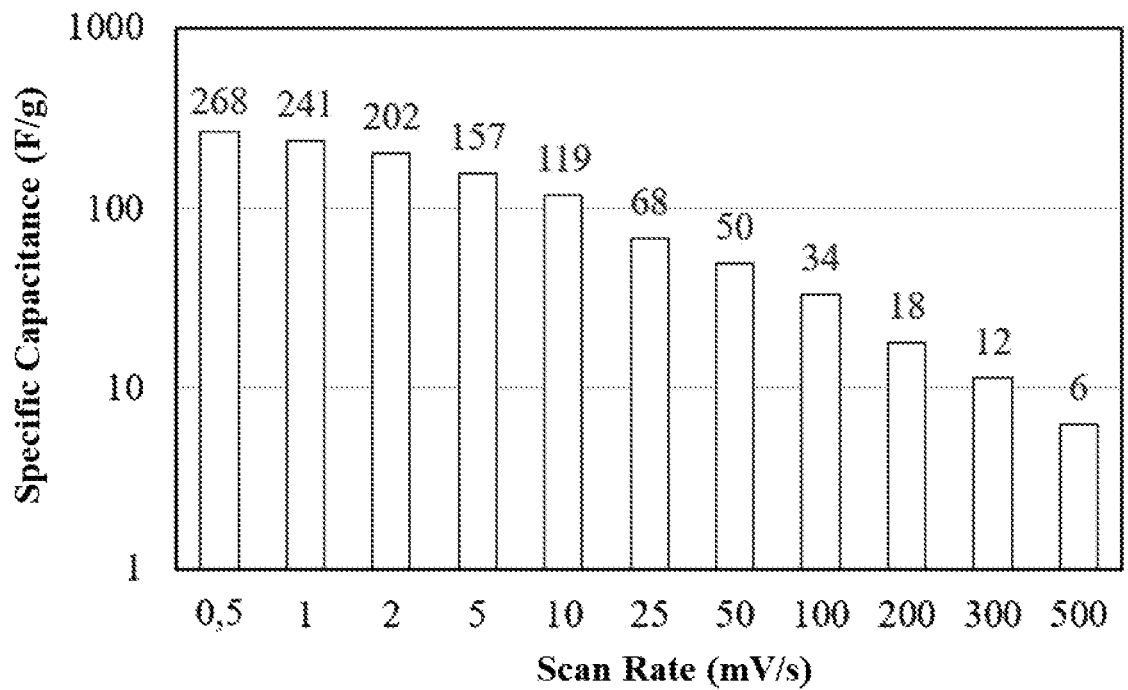
In FIG. 6, the graph of the specific capacitance (F/g) of the EK5 in the potential range of 0-1V at different scan rates (0.5-500 mV/s) is shown.

In FIG. 6, the diagram of the specific capacitance values of the EK5 at different scan rates in the 0-1V potential range is shown. It can be seen from the diagram that it can be used from 0.5 mV/s to 500 mV/s. Based on the results, the operating range of the capacitor related to charge storage can be determined in solid state supercapacitors (50) containing EK5.

Figure 7:
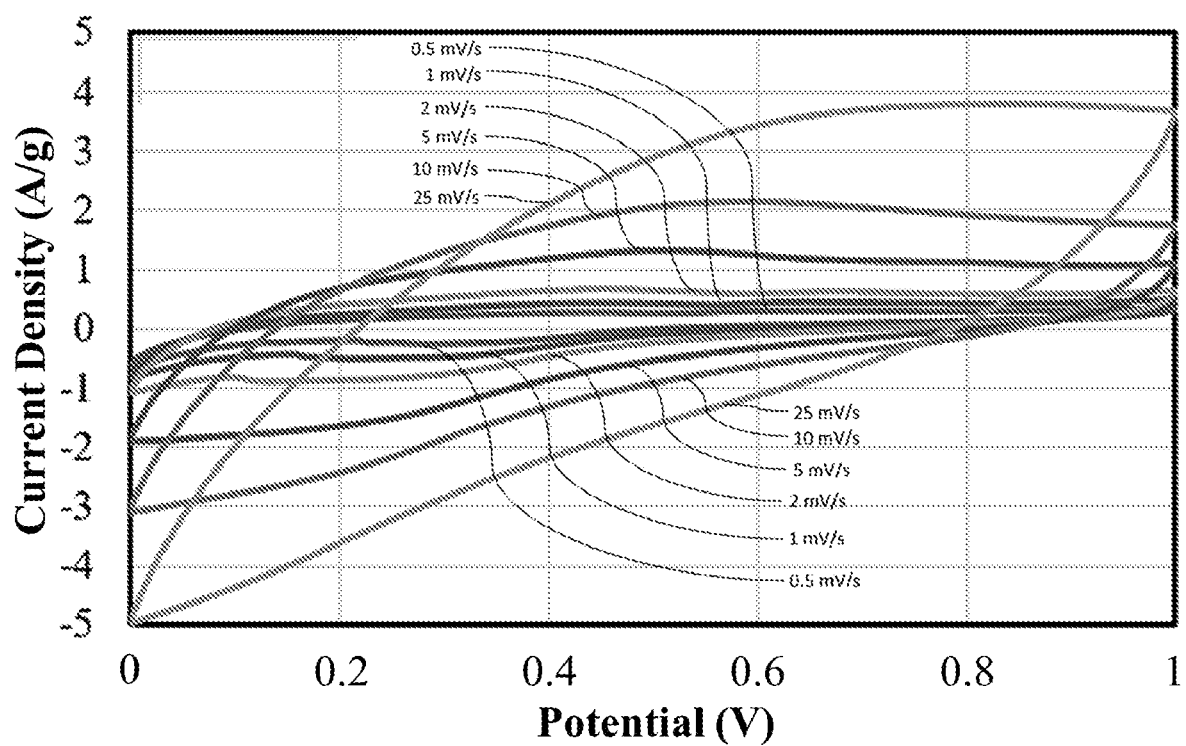
In FIG. 7, cyclic voltammetry (CV) curves of the EK5 in the range of 0.5-25-mV/s scan rates are shown.

FIG. 7 shows the cyclic voltammetry (CV) curves of the EK5 in the range of 0.5-25 mV/s scan rate. The CV curves show that EK5 is usable at these scan rates and can achieve a remarkable current density in solid-state supercapacitors (50). The specific capacitance of the supercapacitor electrodes was developed by poring the carbon nanofiber surfaces using PVA in the initial polymer mixture.

The scope of protection of the invention is specified in the attached claims and cannot be limited to what is explained in this detailed explanation for exemplary purposes. Because it is clear that a person skilled in the art can present similar embodiments in the light of what has been described above without departing from the main theme of the invention.

The invention claimed is:

1. A production method of PVA-PAN nanofiber based porous carbon nanofiber electrode for use in solid-state supercapacitors, the method comprising:
    preparation of polymer solutions by dissolving a PVA-PAN mixture with a total polymer concentration of 7.5% by weight (67% PAN-33% PVA by mass) in a 2:1 mixture of DMF and DMSO by weight at 80° C. for at least 12 hours;
    production of hybrid nanofiber structures by an electrospinning method under determined conditions which are tip-collector distance as 12.5-22.5 cm, a polymer feed rate of 0.5-3 ml/hour, a rotation speed of an aluminum drum of 100-500 rpm, and an applied voltage of 20-35 kV;
    by keeping the PAN/PVA hybrid nanofiber surfaces in water at 90° C. for 1-3 hours, the PVA in the hybrid nanofibers is mostly dissolved in hot water and then dried at room temperature, thus producing porous nanofibers, stabilization of nanofibers as a result of oxidation provided by heating with a heating rate of 4° C./min from room temperature to 250-300° C. and then keeping it at 250-300° C. for 60-120 minutes; and
    heating from room temperature to 250-300° C. with a heating rate of 5-20° C./min, kept at 250-300° C. for 30-90 minutes, and then it is heated from 250-300° C. to 800-1500° C. with a heating rate of 2-10° C./min and carbonized at 800-1500° C. for 2-5 hours in an argon atmosphere.

2. A PVA-PAN hybrid nanofiber based porous carbon nanofiber electrode for solid-state supercapacitors with a porous structure that allows it to be flexible, easy to scale up and increase the surface area, produced by the electrode production method according to claim 1.

3. A solid-state supercapacitor containing flexible substrates on the top and bottom, aluminum foil adjacent to the flexible substrate, and adjacent to the aluminum foil two PVA-PAN hybrid nanofiber-based porous carbon nanofiber electrodes according to claim 2, with a polymer electrolyte between them.

* * * * *